Figure 1:
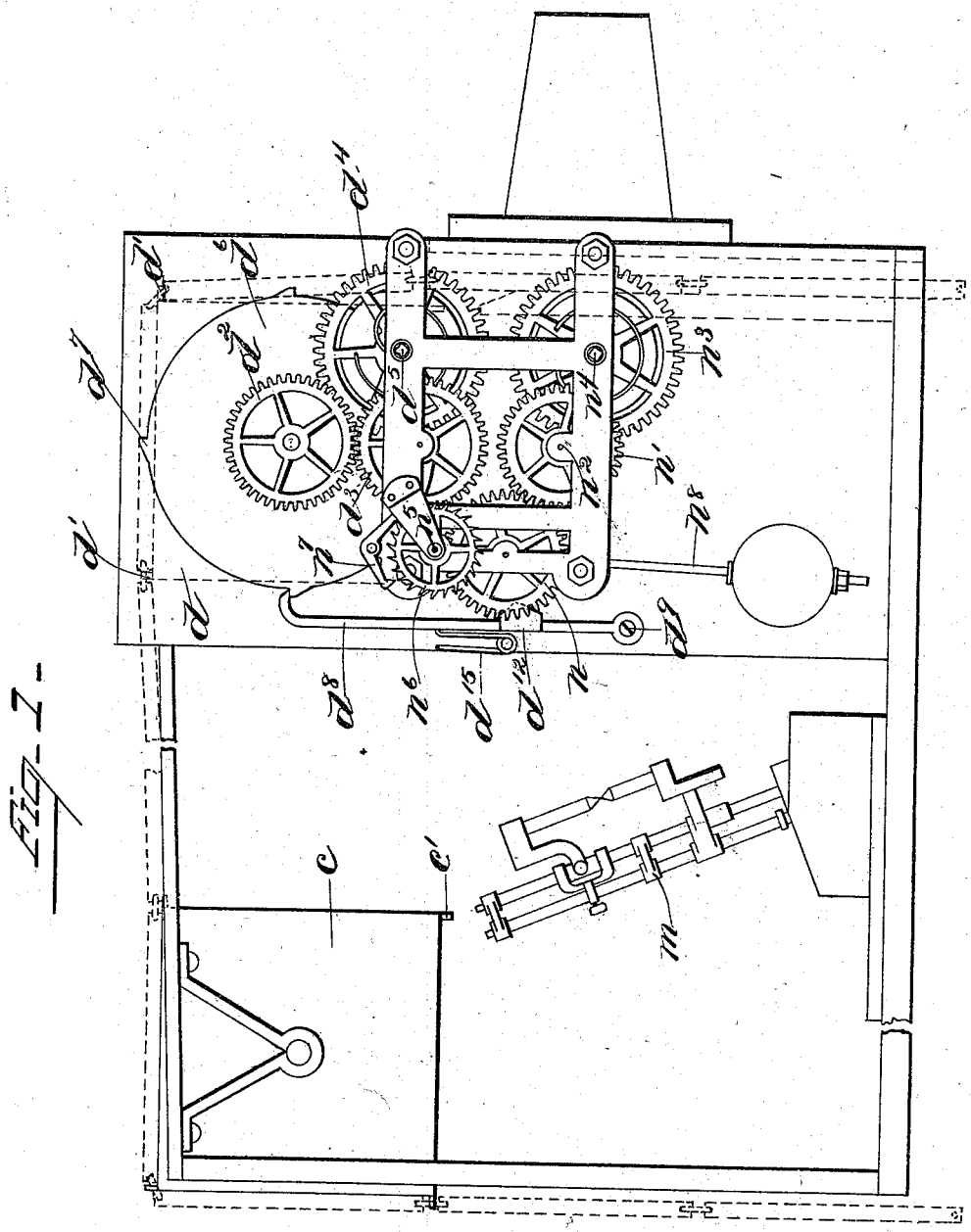

(No Model.) 3 Sheets—Sheet 1.

E. HUDSON.
STEREOPTICON ADVERTISING DEVICE.

No. 552,663. Patented Jan. 7, 1896.

WITNESSES
Charles B. Crocker.
F. H. Davis.

INVENTOR
Edmund Hudson,
by B. J. Noyes,
atty.

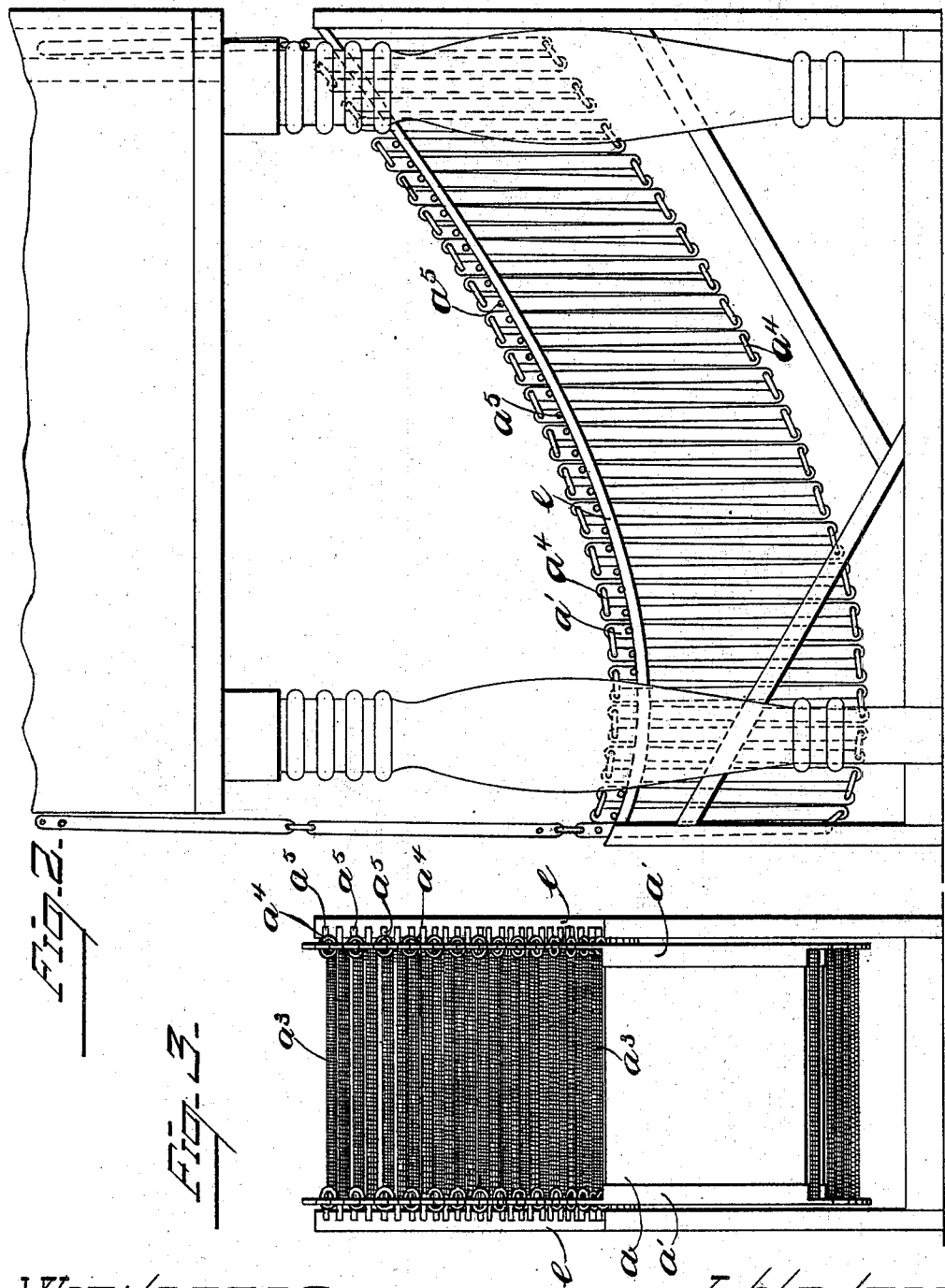

(No Model.) 3 Sheets—Sheet 3.
E. HUDSON.
STEREOPTICON ADVERTISING DEVICE.
No. 552,663. Patented Jan. 7, 1896.
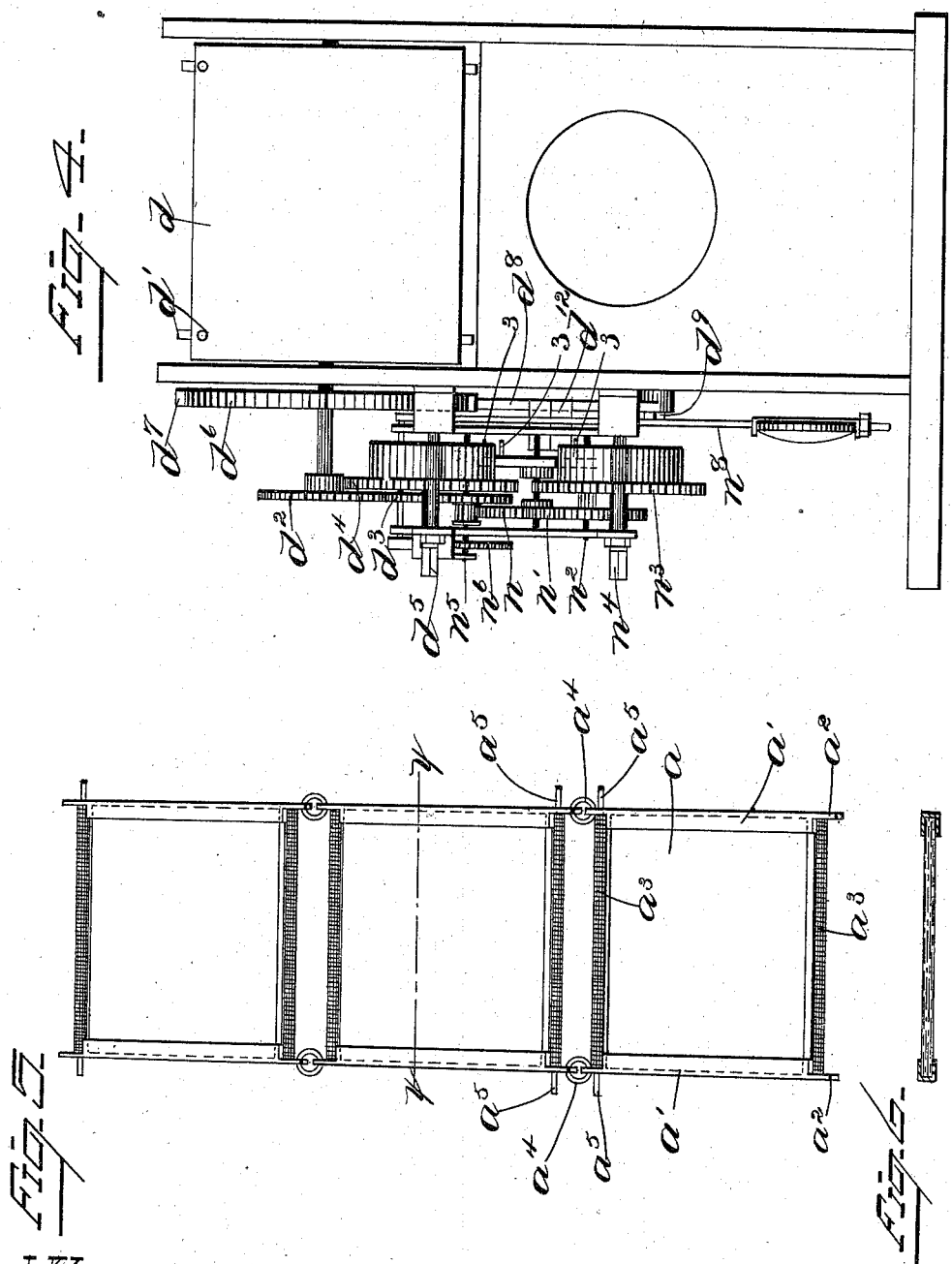

UNITED STATES PATENT OFFICE.

EDMUND HUDSON, OF HARTFORD, CONNECTICUT.

STEREOPTICON ADVERTISING DEVICE.

SPECIFICATION forming part of Letters Patent No. 552,663, dated January 7, 1896.

Application filed March 25, 1895. Serial No. 543,128. (No model.)

*To all whom it may concern:*

Be it known that I, EDMUND HUDSON, of Hartford, county of Hartford, and State of Connecticut, have invented an Improvement in Stereopticon Advertising Devices, of which the following description, in connection with the accompanying drawings, is a specification, like letters and figures on the drawings representing like parts.

This invention has for its object to construct a stereopticon advertising device or apparatus which when once set in operation continues to successively display the plates or slides without the attention of an operator.

In accordance with this invention the "plates" or "slides," as they are commonly called, having thereon an advertisement or picture to be displayed, are loosely or flexibly connected together to form an endless chain, and two drums are provided over which said endless chain passes, one of which is operated to successively present the plates or slides be-intermittingly by suitable motor mechanism tween any usual condensing and focusing lenses, or between the light and lens, as desired, each plate or slide remaining in such position for a short predetermined interval of time. A plate-support is provided beneath said drums, which consists of a pair of declining rods or bars arranged a suitable distance apart to receive between them the slides or plates, they being suspended from and supported by said rods or bars by pins projecting laterally from the endless chain, there being pins between the alternate plates or slides. The plates, suspended from the declining rods or bars, are removed from the lower ends thereof and deposited upon the upper ends thereof, they moving from end to end of said rods or bars by gravity.

Figure 1 shows in side elevation an automatic stereopticon advertising device embodying this invention, the plate-support being omitted to save space on the drawing; Fig. 2, a side elevation of the plate-support; Fig. 3, a left-hand end view of the plate-support; Fig. 4, a right-hand end view of the advertising device shown in Fig. 1; Fig. 5, a detail of a portion of the endless chain of stereopticon-plates; Fig. 6, a cross-section taken on the dotted line $x$ $x$ of one of the plates and its holder.

Plates or slides $a$ of any usual or suitable kind, having thereon advertisements, pictures, &c., to be displayed, are held in place between two end clips $a'$, which embrace the edges of said slides or plates, each end of each clip having a projecting ear $a^2$, and the ears of one clip are connected to the ears of the opposite or fellow clip by spiral springs $a^3$, the action of which is to draw the clips toward each other and thereby hold the stereopticon-plate between them. The plate-holder thus constructed is easily extended to substitute new plates. The ears $a^2$ each have a small eye, and rings $a^4$ pass through the eyes of adjacent ears, thereby loosely or flexibly connecting the plate-holders together as a chain. These rings $a$ also subserve another purpose, as will be described.

From the adjacent ends of each pair of plate-holders pins $a^5$ project outwardly, and as an easy way of providing said pins I may employ a rod of suitable length which is inserted through the ears $a^2$ and through the spiral spring, yet the pins may be otherwise provided. There is no particular objection to providing said pins on the adjacent ends of all the plate-holders, but for the particular use for which I propose to employ the pins I find that provision on the adjacent ends of each pair to be sufficient.

The endless chain of plates passes over an idle-drum $c$ and a motor-driven drum $d$ located at the upper part of the apparatus, while the large number of plates of the chain are supported by a plate-support located at the lower part of the apparatus.

The idle-drum $c$ is made quadrangular and journaled in suitable bearings provided for it and is provided with pins or studs $c'$ at the corners, which enter the rings $a^4$ which connect the plate-holders together, and by such engagement with the chain positively hold it. The motor-driven drum $d$ is also quadrangular, and likewise provided at the corners with pins or studs $b'$ which enter the rings $a^4$ for the purpose of drawing along or advancing the chain. The plates leaving the drum $d$ descend to the plate-support, and in their descent pass between condensing and focusing lenses (not shown) or between the light and lens, as desired, according to the style of stereopticon employed.

The plate-support consists of a pair of declining rods or bars $e$, slightly curved upward at their lower ends, and said rods or bars are properly supported side by side with sufficient space between them for the plate-holders to hang free, being thus held suspended by the outwardly-projecting pins $a^5$ bearing upon the rods or bars.

As the plate-holders of the chain are deposited upon the rods or bars one by one, as shown in Fig. 2, they fold upon themselves and follow down the declined portion of said rods or bars, and the slight upward curve provided at the lower ends of said rods or bars prevents the series supported thereon from sliding off by reason of the weight above. As the plates are removed from the lower end of the plate-support, by being drawn up over the idle-drum, other plates are deposited at the upper end of the plate-support, and the weight of the plates is sufficient to maintain compactness at all times so that the plates will move along the plate-support by gravity. By providing a plate-support of this or some similar or equivalent construction I am enabled to make up a chain comprising a very large number of plates.

One form of motor mechanism is herein shown for operating the drum $d$, yet it is understood that any other form or construction may be employed capable of carrying out substantially the same results.

The motor mechanism herein shown for moving the drum $d$ consists of a toothed wheel $d^2$, secured to one of the journals of the drum, and engaged by a toothed wheel $d^3$, secured to a shaft carrying a pinion which is engaged and driven by a toothed wheel $d^4$, mounted upon the shaft $d^5$, carrying a main spring, or it may be a weight. A wheel or disk $d^6$, which may be called the "stop-wheel," is secured to one of the journals of the drum $d$, which is provided with several projections $d^7$, which are successively engaged by a detent $d^8$, pivoted at $d^9$, and pressed into engagement with the stop-wheel $d^6$ by a spring $d^{10}$ or otherwise. The detent $d^8$ has formed upon or secured to it a projection $d^{12}$, which lies in the path of movement of and so as to be struck at regular intervals by pins or projections 3 on a disk 4, secured to a shaft 5 of another spring-actuated train or motor. As herein represented, this motor is constructed as a timepiece—that is, it is adapted to continuously operate—and consists of a toothed wheel $n$ secured to the shaft 5, in front of the disk 4, which is engaged and driven by a toothed wheel $n'$ secured to a shaft $n^2$, carrying a pinion which is engaged and driven by a toothed wheel $n^3$, mounted upon the winding-shaft $n^4$, carrying the main spring, or it may be a weight. The toothed wheel $n$ engages and drives a pinion on a shaft $n^5$, to which is secured the escape-wheel $n^6$, engaged by any suitable pallet $n^7$, connected with a pendulum $n^8$ or other regulator. As this continuously-running motor operates, the pins 3 on the disk or wheel 4 successively strike the projection $d^{12}$ and move the detent $d^8$ sufficiently to disengage one of the projections $d^7$ on the stop-wheel $d^6$, and immediately thereafter pass by said projection $d^{12}$, permitting the detent $d^8$ to resume its normal position in time to engage or catch the next projection $d^7$ on the stop-wheel. As the stop-wheel $d^6$ is provided with four projections $d^7$, and is thus released, the drum $d$ will be turned a quarter of a revolution, thereby advancing the flexible chain of plates a distance corresponding to one plate. The chain of plates is thus intermittingly advanced, one of the plates being before the display-opening during the time between the successive actions of the pins 3.

It will be observed that when the apparatus is wound up and started it will continue to operate until it has run down or is stopped, and no attention is required, its action being practically automatic.

Any usual or suitable lamp may be provided—as, for instance, an electric-arc lamp, which is represented at $m$.

I claim—

1. In a stereopticon advertising device, a flexible endless chain of stereopticon plates, having outwardly projecting pins $a^5$, between alternate plates, two drums over which it passes, means for operating one of said drums intermittingly, and a plate-support beneath said drums consisting of a pair of declining rods or bars arranged to hold the plates suspended between them, by means of the pins $a^5$ resting upon them, substantially as described.

2. In a stereopticon advertising device, a flexible endless chain of stereopticon plates, having outwardly projecting pins $a^5$ between alternate plates, two drums over which it passes, means for operating one of said drums intermittingly, and a plate-support beneath said drums consisting of a pair of declining rods or bars with lower upwardly formed ends, said rods or bars receiving and supporting the plates by the pins $a^5$ resting thereon, substantially as described.

3. In a stereopticon advertising device, a flexible endless chain of stereopticon plates, having pins $a^5$ between alternate plates, a plate-support therefor, consisting of a pair of declining rods or bars, which hold the plates suspended between them by the pins $a^5$ resting thereon, two drums above said plate-support over which said endless chain passes, a motor for operating one of said drums intermittingly, a stop wheel and detent for said motor, a continuously running motor and means operated thereby for releasing said detent at regular intervals of time, substantially as described.

4. A flexible chain of stereopticon plates, consisting of plates $a$, metallic clips $a'$, embracing the edges thereof and having ears $a^2$, spiral springs $a^3$ connecting the ears of opposite clips and acting to draw them toward each other to hold the plate, and rings $a^4$ passing through eyes formed in the adjacent ears $a^2$, loosely connecting the plate holders together, and affording means by which the chain may be fed along, substantially as described.

In testimony whereof I have signed my name to this specification in the presence of two subscribing witnesses.

EDMUND HUDSON.

Witnesses:
 MORTON H. STRICKLAND,
 CLAYTON W. ROWLEY.